(12) United States Patent
Atkins et al.

(10) Patent No.: US 8,525,933 B2
(45) Date of Patent: Sep. 3, 2013

(54) SYSTEM AND METHOD OF CREATING OR APPROVING MULTIPLE VIDEO STREAMS

(75) Inventors: Robin Atkins, Vancouver (CA); Anne Webster, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 120 days.

(21) Appl. No.: 13/191,615

(22) Filed: Jul. 27, 2011

(65) Prior Publication Data

US 2012/0026405 A1    Feb. 2, 2012

Related U.S. Application Data

(60) Provisional application No. 61/369,845, filed on Aug. 2, 2010.

(51) Int. Cl.
*H04N 9/64* (2006.01)
*H04N 9/65* (2006.01)
*H04N 3/36* (2006.01)
*H04N 9/11* (2006.01)
*G06F 15/16* (2006.01)
*H04L 29/06* (2006.01)

(52) U.S. Cl.
USPC ............. 348/651; 348/708; 348/642; 348/97; 709/246; 713/150

(58) Field of Classification Search
None
See application file for complete search history.

(56) References Cited

U.S. PATENT DOCUMENTS

| | | | |
|---|---|---|---|
| 6,317,153 B1 | 11/2001 | Fasciano | |
| 7,053,927 B2 * | 5/2006 | Jones et al. | 348/97 |
| 7,639,882 B2 | 12/2009 | Itakura | |
| 2002/0120781 A1 * | 8/2002 | Hirashima et al. | 709/246 |
| 2007/0268411 A1 | 11/2007 | Rehm | |
| 2007/0291179 A1 * | 12/2007 | Sterling et al. | 348/642 |
| 2009/0109344 A1 * | 4/2009 | Ollivier et al. | 348/708 |
| 2011/0246761 A1 * | 10/2011 | Alexandrov | 713/150 |

FOREIGN PATENT DOCUMENTS

| | | |
|---|---|---|
| WO | 2008085150 | 7/2008 |
| WO | 2008122702 | 10/2008 |
| WO | 2009002324 | 12/2008 |
| WO | 2009005495 | 1/2009 |
| WO | 2009095732 | 8/2009 |
| WO | 2009095733 | 8/2009 |
| WO | 2010021705 | 2/2010 |

OTHER PUBLICATIONS

Mitsubishi Diamond Plus 200, User's guide, 1999 Mitsubishi Electronic Corporation, p. 9, figure 3, A/B switch.*

* cited by examiner

*Primary Examiner* — Jefferey Harold
*Assistant Examiner* — Sean Haiem

(57) ABSTRACT

In an embodiment, a system generates multiple video streams. The system includes a color grading device and an appearance mapping device. The appearance mapping device operates on the data generated by the color grading device, and both the output of the color grading device and the output of the appearance mapping device may be displayed (and edited) simultaneously. In this manner, the efficiency of the editing process is improved.

3 Claims, 8 Drawing Sheets

SYSTEM AND METHOD OF CREATING OR APPROVING MULTIPLE VIDEO STREAMS

CROSS REFERENCE TO RELATED APPLICATIONS

This Application claims the benefit of priority to related, Provisional U.S. Patent Application No. 61/369,845 filed on 2 Aug. 2010 entitled "System and Method of Creating or Approving Multiple Video Streams" by Robin Atkins, et al. hereby incorporated by reference in its entirety.

BACKGROUND

The present invention relates to image display devices, and in particular, to adjusting content for display on multiple display devices.

Unless otherwise indicated herein, the approaches described in this section are not prior art to the claims in this application and are not admitted to be prior art by inclusion in this section.

Traditionally, content has been edited on a single display device, the reference monitor. This edited content is then distributed to consumer display devices, which assume the properties of the reference monitor. The consumer devices automatically re-render the content to account for their display capabilities or their environment. Typical consumer devices include televisions, computer monitors, mobile telephones, etc.

Re-rendering video content at the consumer device is difficult to do correctly. From a single reference point (the appearance on the reference monitor), the video data ranges are extrapolated to the best of the consumer device's processing capabilities and mathematical models of the human visual system. However, color choices are seldom consistent with mathematical models; instead, they are highly dependent on the content itself as well as on the artistic intent for the content.

One solution is to create, approve and distribute multiple formats of the same content. Each format is edited to have the same artistic intent for a different display device or viewing condition. Consumer display devices are then able to select from or interpolate between the multiple "approved" renderings to obtain a version most similar to the display capabilities or viewing environment.

Various systems exist for generating multiple versions of content. One way is to perform color adjustment for each master version of the content, as described in U.S. Application Pub. No. 2007/0291179. Another way is to provide multiple virtual model specifications and to select one when performing editing, as described in WO 2008/085150. Another way is to provide modulation frequency function metadata with the content to consumers, as described in WO 2009/005495. Another way is to pre-visualize certain "looks" that can be applied in the editing process, as described in U.S. Pat. No. 7,053,927. Another way is to perform color correction using color correction metadata, as described in U.S. Application Pub. No. 2007/0268411. Another way is to perform nulling tests in order to convert color correction instructions between devices, as described in U.S. Pat. No. 6,317,153.

SUMMARY

Given the existing solutions discussed in the Background, each additional version of the content to be created requires time and effort on the part of the content creator (typically the artist, director, editor or studio). This can incur significant cost and time.

An embodiment displays multiple versions of content at editing time. Adjusting the parameters for one version may also adjust the appearance of another version, which may then be further adjusted within the editing process. This increases the efficiency of the editing process when creating multiple versions of the content.

According to an embodiment, a system edits multiple video streams. The system includes a color grading device and an appearance mapping device. The color grading device is configured to receive first image data and color grading parameters, to perform color grading on the first image data according to the color grading parameters, and to generate second image data that corresponds to the first image data having been color graded. The color grading device is configured to receive user adjustment of the color grading parameters in response to the second image data being displayed on a first display device. The appearance mapping device is configured to receive the second image data and appearance mapping parameters, to perform appearance mapping on the second image data according to the appearance mapping parameters, and to generate third image data that corresponds to the second image data having been appearance mapped. The appearance mapping device is configured to receive user adjustment of the appearance mapping parameters in response to the third image data being displayed on a second display device. In this manner, the appearance mapping device operates on the data output from the color grading device, and the outputs of the first and second display devices may be viewed (and edited) simultaneously, improving the efficiency of the editing process.

According to an embodiment, the video editing system includes a storage device that is configured to store the second image data and the third image data.

According to an embodiment, the video editing system includes an encoder device that is configured to generate encoded data that includes the second image data and the appearance mapping parameters.

According to an embodiment, the video editing system includes a user device that is configured to receive the second image data and the appearance mapping parameters, to map from the second image data using the appearance mapping parameters as guide curves, to generate mapped data according to the second image data having been mapped, and to display the mapped data.

According to an embodiment, the video editing system includes a switch that is configured to selectively provide the second image data and the third image data to a single multi-mode display device.

According to an embodiment, the video editing system includes a transform device. The transform device is configured to receive the second image data, to perform a first transform on the second image data, to generate first transformed data according to the second image data having been transformed, and to provide the first transformed data to the first display device. The first transform reduces a characteristic of the second image data that exceeds a display capability of the first display device. The color grading device is configured to receive user adjustment of the color grading parameters in response to the first transformed data being displayed on the first display device.

According to an embodiment, a method is provided for editing multiple video streams. The method includes receiving, by a color grading device, first image data and color grading parameters. The method further includes performing, by the color grading device, color grading on the first image data according to the color grading parameters. The method further includes generating, by the color grading device, second image data that corresponds to the first image data having been color graded. The method further includes displaying, by a first display device, the second image data. The method further includes receiving, by the color grading device, user adjustment of the color grading parameters in response to the second image data being displayed by the first display device. The method further includes receiving, by an appearance mapping device, the second image data and appearance mapping parameters. The method further includes performing, by the appearance mapping device, appearance mapping on the second image data according to the appearance mapping parameters. The method further includes generating, by the appearance mapping device, third image data that corresponds to the second image data having been appearance mapped. The method further includes displaying, by a second display device, the third image data. The method further includes receiving, by the appearance mapping device, user adjustment of the appearance mapping parameters in response to the third image data being displayed by the second display device.

According to further embodiments, the method includes acts similar to those described for the video editing system related to the functionality of the storage device, the transform device, the encoder device, and the user device.

According to an embodiment, a computer program (tangibly embodied on a physical computer readable medium) is provided for editing multiple video streams. The computer program controls a computer system to execute processing that generally corresponds to the acts described in relation to the method of editing multiple video streams.

The following detailed description and accompanying drawings provide a further understanding of the nature and advantages of the present invention.

DETAILED DESCRIPTION

Described herein are techniques for improving the efficiency of editing multiple versions of content, e.g. for different display devices. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, the terms "video data" and "image data" are used. These terms are to be considered to be used interchangeably. Video data refers to data that represents moving images or still images.

Figure 1:
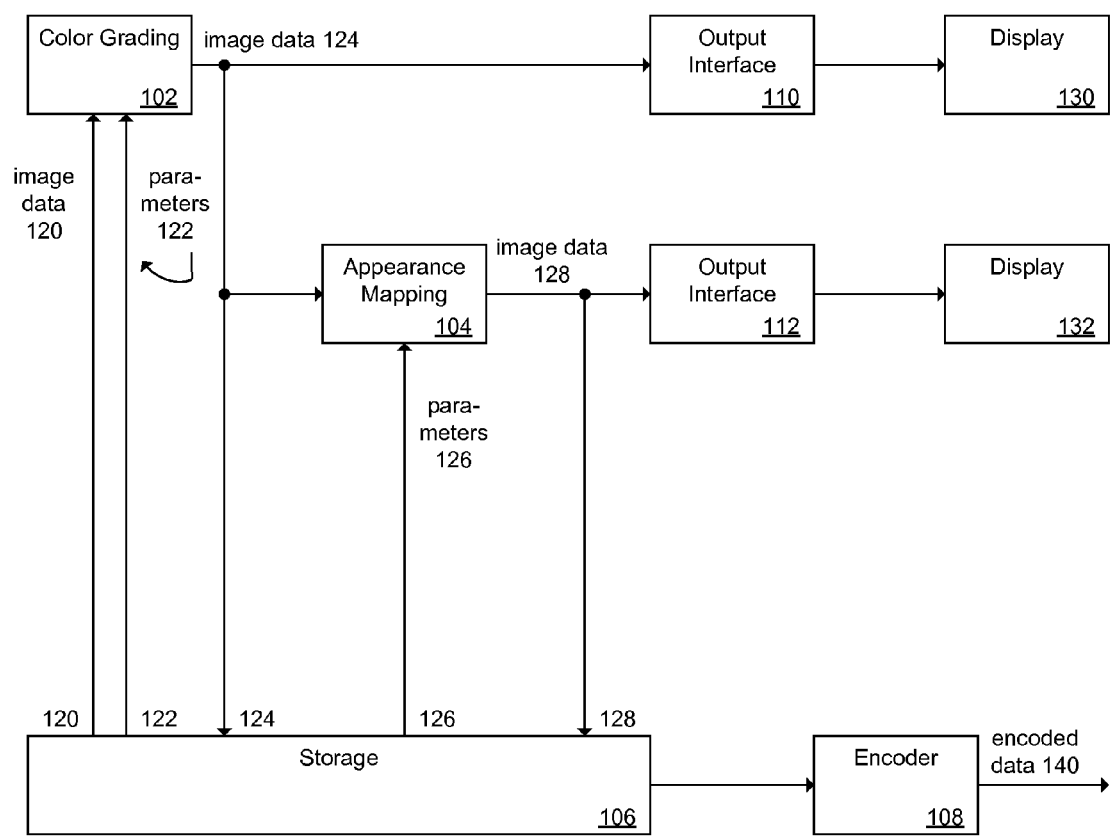
FIG. 1 is a block diagram of a video editing system according to an embodiment.

FIG. 1 is a block diagram of a video editing system 100 according to an embodiment. The video editing system 100 includes a color grading device 102, an appearance mapping device 104, a storage device 106, an encoder device 108, and output interfaces 110 and 112. The video editing system 100 is connected to two displays 130 and 132. In general, the display 130 is more capable (e.g., higher quality) than the display 132.

The components of the video editing system 100 are shown functionally in FIG. 1. According to an embodiment, the video editing system 100 may be implemented by a computer that includes a memory, a processor, a disk drive, a bus, various input/output interfaces, etc. (not shown). For example, the video editing system 100 may operate on high dynamic range (HDR) data as an input, and may generate video output via high definition serial digital interfaces (HD-SDIs). The computer may generally include hardware components or software components that implement the functionality shown in FIG. 1. According to an embodiment, the video editing system 100 may be implemented by a server that includes multiple parallel processors or graphics processing units. The server may run an operating system such as Linux. The server may execute color grading software such as DaVinci Resolve™, Autodesk Lustre™, IRIDAS Speedgrade™, Assimilate Scratch™, etc. The color grading software generally includes a high performance component to perform the rendering and a graphical user interface.

The color grading device 102 performs color grading of an image. In general, after video data has been captured by a camera, an editor performs color grading on the video data so that the resulting output has the desired color appearance. More specifically, the editor performs color grading of the initial image data 120 by adjusting the color grading parameters 122; the color grading device 102 uses the color grading parameters 122 to process the initial image data 120, to generate color graded image data 124; the editor views the image data 124 displayed by the display 130. Typical parameters 122 of the video data that may be adjusted in color grading include gain, lift, gamma, hue and saturation. The editor may also use the color grading device to apply curves for color grading to individual channels of an image, to apply 3D lookup tables (LUTs), to apply masks to select certain pixel values, to apply shapes to select certain spatial regions of an image, etc. The color grading device 102 may also allow the editor to use masks in order to apply different color gradings to different portions of the image. For example, the background may be masked as part of color grading to enhance the foreground. As another example, skin tones or other particular colors that have a critical appearance may be masked. As another example, shapes such as car headlights may be masked.

The appearance mapping device 104 performs appearance mapping of an image. In general, appearance mapping refers to adjusting an image so that the image displays as desired on a particular output device, or because of changes in the ambient lighting. For example, if viewers will be viewing the image data 124 on the display 132 that is less capable than the display 130, then it is often useful for the editor to assess the appearance mapping of the image data as part of the editing process. More specifically, the display 130 may be a display such as the Dolby ProMonitor™, which has a peak luminance of 600 nits, a minimum luminance of 0.005 nits, and P3 color gamut; the display 132 may be a low dynamic range (LDR) display that includes a conventional cathode ray tube (CRT), which has a peak luminance of 100 nits, a minimum luminance of 0.01 nits, and sRGB color gamut.

Although appearance mapping may be performed on the image data prior to the color grading, in the video editing system 100 the appearance mapping is performed on the image data 124 after color grading. More specifically, the editor performs appearance mapping of the image data 124 by adjusting the appearance mapping parameters 126; the appearance mapping device 104 uses the appearance mapping parameters 126 to process the image data 124, in order to generate appearance mapped image data 128; and the editor views the image data 128 displayed by the display 132. Typical parameters 126 of the video data that may be adjusted in appearance mapping include color gamut, dynamic range, luminance, contrast, saturation, hue, tone, etc.

The appearance mapping device 104 may perform appearance mapping according to guide curves. Guide curves are visual representations of functions that convert one value to another value. Guide curves may be described as linear, quadratic, hard clipping, soft clipping, compression, expansion, continuous, discontinuous, etc., or a combination of these terms. The guide curves may be applied to each channel of the image data 124, for example, the RGB channels, the Yuv channels, the LMS channels, the IPT (light-dark, red-green, yellow-blue) channels, etc. The appearance mapping device 104 may apply the guide curves algorithmically. For example, the algorithm may be a linear equation (e.g., value2=0.5*value1) when value1 is below 2.0 and a constant (e.g., value2=1.0) when value1 is above 2.0. The appearance mapping device 104 may apply the guide curves based on presets or on a lookup table stored in the appearance mapping device 104 (e.g., in a memory circuit) or in the storage device 106. More specifically, the lookup table stores values that, when reproduced graphically, correspond to a particular guide curve. For example, when value1 is 2.0, the appearance mapping device 104 accesses the lookup table to obtain 1.0 for value2.

By the editor adjusting both the color grading parameters 122 and the appearance mapping parameters 126 together, and the video editing system 100 displaying both resulting images on the displays 130 and 132 together, the editor is able to perform precise editing of the artistic intent on both displays. By integrating two displays, the video editing system 100 is able to reduce the time and effort involved in editing the video data into multiple versions for display by multiple display devices. This improvement is especially noteworthy as compared to editing systems that have only a single display or otherwise involve editing multiple versions in sequence, instead of in parallel. More specifically, in the video editing system 100, a single change to the color grading parameters may result in changing the images displayed by both the displays 130 and 132. This may be contrasted with editing systems in which a single change to the color grading parameters may change the images displayed on only one display; another change to the color grading parameters is required to change the images displayed on another display, which may be less efficient.

The storage device 106 stores the image data 120, the color grading parameters 122, the image data 124, the appearance mapping parameters 126, and the image data 128. The storage device 106 may include a nonvolatile storage component (e.g., a disk drive) or a volatile storage component (e.g., a memory circuit). The storage device 106 may also store one or more computer programs that implement the functionality of other components of the video editing system 100 (e.g., a computer program that controls or implements the color grading device 102). Alternatively, the video editing system 100 receives the image data 120 from an external device, in which case the storage device 106 need not (but may) store the image data 120. According to a further alternative, the parameters 122 or 126 are provided according to user input via a user interface, in which case these parameters need not be "stored" per se.

The encoder device 108 takes the information stored in the storage device 106, formats the information in a desired format, and outputs the encoded data 140. For example, the encoder device 108 may use the image data 124 and the image data 128 to generate the encoded data 140. As another example, the encoder device 108 may use the image data 124 and the appearance mapping parameters 126 to generate the encoded data 140. As another example, the encoder device 108 may use the image data 124 to generate the encoded data 140. As yet another example, the encoder device 108 may use the image data 128 and the appearance mapping parameters 126 to generate the encoded data 140. The encoder device 108 may encode the image data 124 (or the image data 128) in a base layer, and may encode the other image data 128 (or the image data 124) in an enhancement layer. Alternatively, the encoder device 108 may encode the image data 124 in a base layer, and may encode the parameters 126 as metadata, for subsequent generation of the enhancement layer (corresponding to the image data 128). As an example, the encoder device 108 may implement the H.264 standard to generate the encoded data 140. Packaging and distributing the appearance mapping parameters 126 guides end user display devices in mapping one or more versions of the video stream to within their capabilities and for their local environment, as further discussed below.

Another feature of the video editing system 100 is an increased correlation between the image data 124 and 128, as compared to other existing solutions. The amount of this correlation was not apparent until implementations of the video editing system 100 were under development. This increased correlation has a benefit of increasing the compression efficiency of the encoder device 108. It is theorized that the extent of adjustments to the same source data (the image data 124) performed by the appearance mapping device 104 is reduced as compared to other existing solutions.

According to an alternative embodiment, the encoder device 108 is a separate component that connects to the video editing system 100. Further details regarding the encoder device 108 are provided below under the heading "Subsequent Transmission of Multiple Content".

The output interface 110 provides a connection between the video editing system 100 and the display device 130. According to an embodiment, the output interface 110 is a HD-SDI connection. Other options to implement the physical interface or protocol for the output interface 110 include 3G SDI, single link SDI, DVI, HDMI, etc. The output interface may package the data into a variety of formats, including RGB, XYZ, YCbCr, Yuv, log RGB, log XYZ, etc.

The output interface 112 provides a connection between the video editing system 100 and the display device 132. According to an embodiment, the output interface 112 is a HD-SDI connection. Other options for the output interface 112 are similar to those discussed above regarding the output interface 110.

Figure 2:
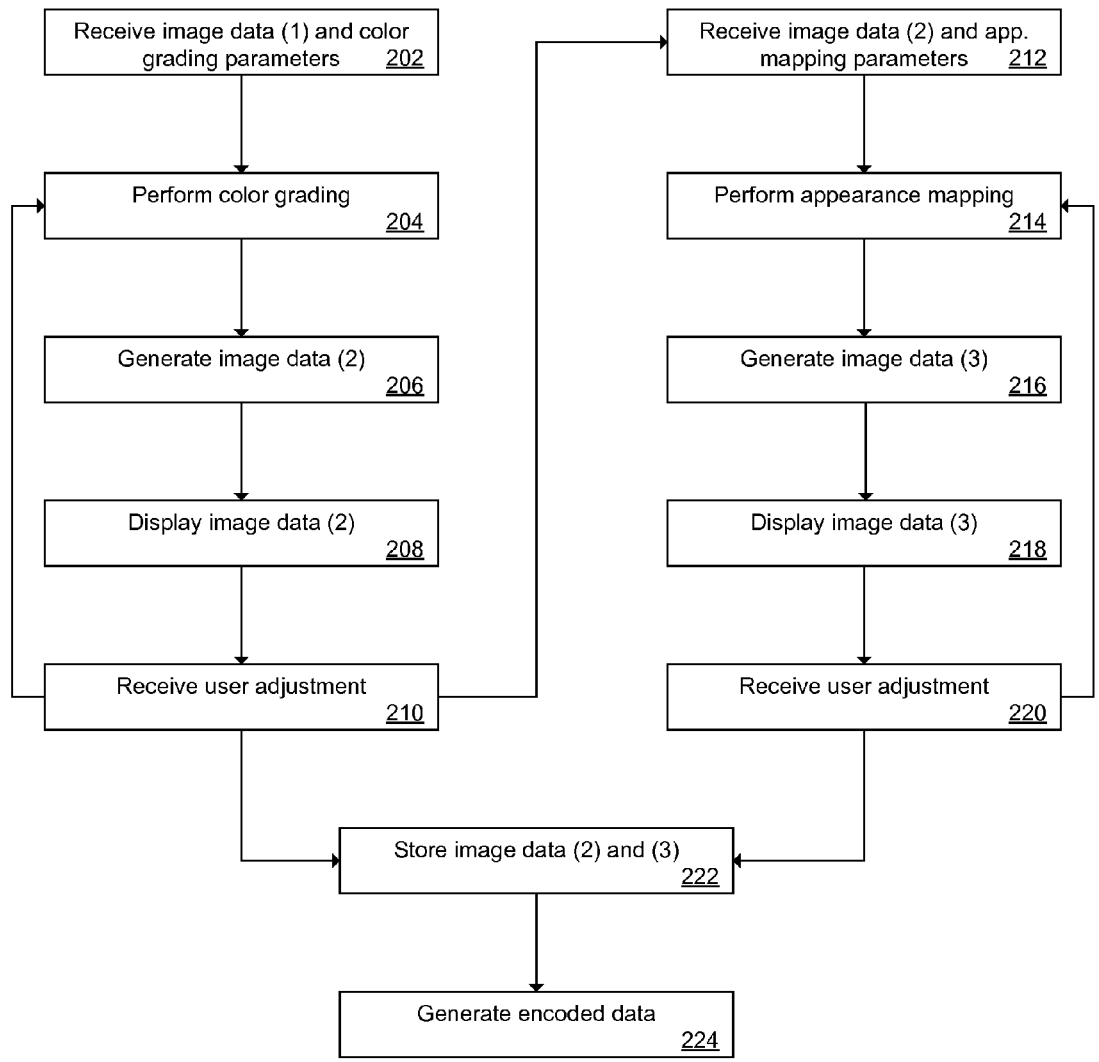
FIG. 2 is a flowchart of a method of editing multiple video streams, according to an embodiment.

FIG. 2 is a flowchart of a method 200 of editing multiple video streams, according to an embodiment. The method 200 may be performed by an editing device such as the video editing device 100 (see FIG. 1). The method 200 may be implemented by a computer program that is executed by a computer system or other hardware device such as the video editing device 100 (e.g., the computer program is stored by the storage device 106).

In 202, a color grading device receives first image data and color grading parameters. For example, the color grading device 102 (see FIG. 1) receives the image data 120 and the color grading parameters 122 from the storage device 106. The color grading parameters 122 may initially be set at default values. Alternatively, the color grading parameters 122 may be null values, in which case the editor may perform user adjustment of the color grading parameters 122 to the extent the color grading device 102 requires data to perform color grading (see 204).

In 204, the color grading device performs color grading on the first image data according to the color grading parameters. For example, the color grading device 102 (see FIG. 1) performs color grading on the image data 120 according to the color grading parameters 122.

In 206, the color grading device generates second image data that corresponds to the first image data having been color graded. For example, the color grading device 102 (see FIG. 1) generates the image data 124 that corresponds to the image data 120 having been color graded (see 204). The second image data may be generated in high precision, e.g., as floating point values.

In 208, a first display device displays the second image data. For example, the display device 130 (see FIG. 1) displays the image data 124. At this point, the data may be quantized or otherwise limited to the range of the relevant display device.

In 210, the color grading device receives user adjustment of the color grading parameters in response to the second image data being displayed by the first display device. For example, the color grading device 102 (see FIG. 1) receives user adjustment of the color grading parameters 122 in response to the image data 124 being displayed by the display device 130. The color grading device 102 may include a keyboard, toggle switches, sliders, a graphical interface, a custom control panel, etc. for receiving this user adjustment.

An iterative loop of 204, 206, 208 and 210 may be performed in order for the output displayed by the first display device to match the artistic intent. For example, the user adjustment of the color grading parameters (210) is used to re-perform the color grading (204). Concurrently with this iterative loop for color grading, appearance mapping may be performed as detailed below.

At 212, an appearance mapping device receives the second image data and appearance mapping parameters. For example, the appearance mapping device 104 (see FIG. 1) receives the image data 124 and the appearance mapping parameters 126 from the storage device 106. As with the color grading parameters 122, the appearance mapping parameters 126 may initially be set at default or null values.

At 214, the appearance mapping device performs appearance mapping on the second image data according to the appearance mapping parameters. For example, the appearance mapping device 104 (see FIG. 1) performs appearance mapping on the image data 124 according to the appearance mapping parameters 126.

At 216, the appearance mapping device generates third image data that corresponds to the second image data having been appearance mapped. For example, the appearance mapping device 104 (see FIG. 1) generates the image data 128 that corresponds to the image data 124 having been appearance mapped (see 214).

At 218, a second display device displays the third image data. For example, the display device 132 (see FIG. 1) displays the image data 128.

At 220, the appearance mapping device receives user adjustment of the appearance mapping parameters in response to the third image data being displayed by the second display device. For example, the appearance mapping device 104 (see FIG. 1) receives user adjustment of the appearance mapping parameters 126 in response to the image data 128 being displayed by the display device 132.

An iterative loop of 214, 216, 218 and 220 may be performed in order for the output displayed by the second device to match the artistic intent. For example, the user adjustment of the appearance mapping parameters (220) is used to re-perform the appearance mapping (214). Since the video editing system 100 allows the color grading loop (204, 206, 208 and 210) to be performed concurrently with the appearance mapping loop (214, 216, 218 and 220), editing multiple streams is more efficient than with many other existing systems.

At 222, a storage device stores the second image data and the third image data. For example, the storage device 106 (see FIG. 1) stores the image data 124 and the image data 128. According to a further embodiment, the storage device stores the color grading parameters and the appearance mapping parameters.

At 224, an encoder device generates encoded data that includes the second image data and the third image data. For example, the encoder device 108 generates the encoded data 140 that includes the image data 124 and the image data 128. According to an alternative embodiment, the encoded data includes the second image data and the appearance mapping parameters. According to another alternative embodiment, the encoded data includes the second image data, the third image data, and the appearance mapping parameters. According to yet another alternative embodiment, the encoded data includes the third image data and the appearance mapping parameters.

In this manner, the time and effort involved in editing the video data into multiple versions for display by multiple display devices is reduced. In addition, the correlation between the multiple versions of the video data may be increased, which may increase the efficiency of the encoding process.

Figure 3:
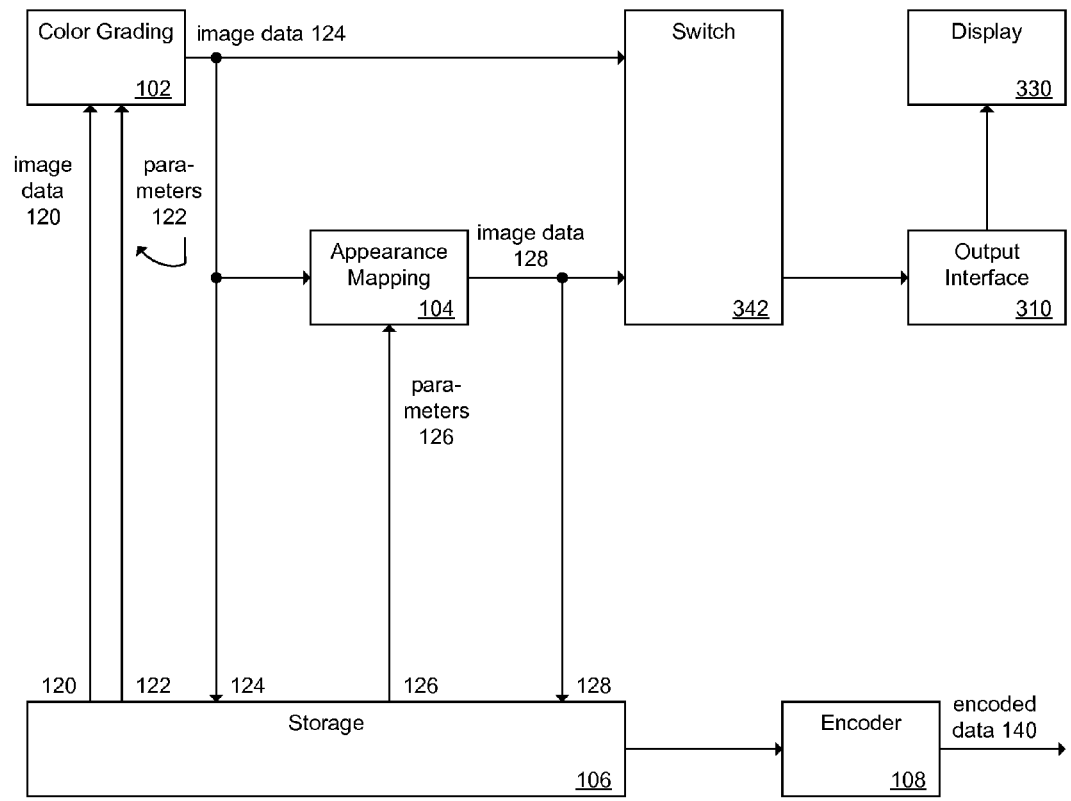
FIG. 3 is a block diagram of a video editing system according to an embodiment.

FIG. 3 is a block diagram of a video editing system 300 according to an embodiment. The video editing system 300 is similar to the video editing system 100 (see FIG. 1), with the addition of a switch 342 and an output interface 310; the video editing system 300 is connected to a single display device 330. For brevity, a description of the components similar to those in FIG. 1 is not repeated.

The switch 342 selectively provides the image data 124 and the image data 128 to the display device 330. The switch 342 may be implemented variously as desired according to various embodiments. One option is a 2-to-1 multiplexer, where the user selects one of the image data 124 and the image data 128 to be displayed at various times during editing. Another option is a mixer that mixes the image data 124 and the image data 128 into a combined format, such as a time division multiplexed format, a frequency division multiplexed format, a data frame format, a data packet format, etc.; the user then selects one of the image data 124 and the image data 128 to be displayed at various times during editing. The specifics of the implementation of the switch 342 will depend upon the recognized inputs to the display device 330, as discussed below. The switch 142 may also implement various display modes. One example mode is a split screen mode, in which the left portion of a display device displays the image data 124 and the right portion displays the image data 128. Another example mode is a butterfly mode, where the screen is split to show half (e.g., the left half) of each of the image data 124 and the image data 128, one of which is flipped horizontally. For example, the left half of the image data 124 is shown on the left side of the split screen, and the left half of the image data 128 is flipped horizontally and is shown on the right side of the split screen. This gives the appearance of a butterfly. The user may then switch over to view the right halves of the image data 124 and 128 in butterfly mode.

The output interface 310 provides a connection between the video editing system 300 and the display device 330. According to an embodiment, the output interface 310 is a HD-SDI connection. Other options for the output interface 310 are similar to those discussed above regarding the output interface 110.

The display device 330 alternatively displays the image data 124 and the image data 128. According to an embodiment, the display device 330 is a multimode display device; in one mode the display device 330 operates as the display device 130 (see FIG. 1), and in another mode the display device 330 operates as the display device 132. The mode in which the display device 330 operates is determined in relation to the operation of the switch 342. For example, if the switch 342 is set to display the image data 124, the switch 342 signals to the display device 330 (via metadata over the output interface 310) to emulate the display mode of the display device 130 (see FIG. 1). Alternatively, the display device 330 may infer an appropriate display mode from the image data received.

According to an alternative embodiment, the display device 330 is configured to accept absolute video signal data as input. In general, an "absolute" signal is defined relative to a predetermined range, whereas a "relative" signal is defined relative to the range of the display device. More specifically, for a relative signal, "zero" corresponds to the minimum value displayable by the display device and "one" corresponds to the maximum value; for an absolute signal, "zero" corresponds to a predetermined minimum (which may be outside the range of the display device). Relative formats include RGB, YCbCr, etc. Absolute formats include log Yuv, XYZ, etc. (RGB may also be used as an absolute format if the range is defined to some predetermined gamut instead of to the capabilities of the display.) When using the absolute signal, the switch 342 may select which video stream to output, and the switch 342 need not explicitly change the mode of the display device 330.

As compared to the video editing system 100 (see FIG. 1), the video editing system 300 allows the editor to create multiple video streams without repositioning the gaze, further increasing efficiency.

Figure 4:
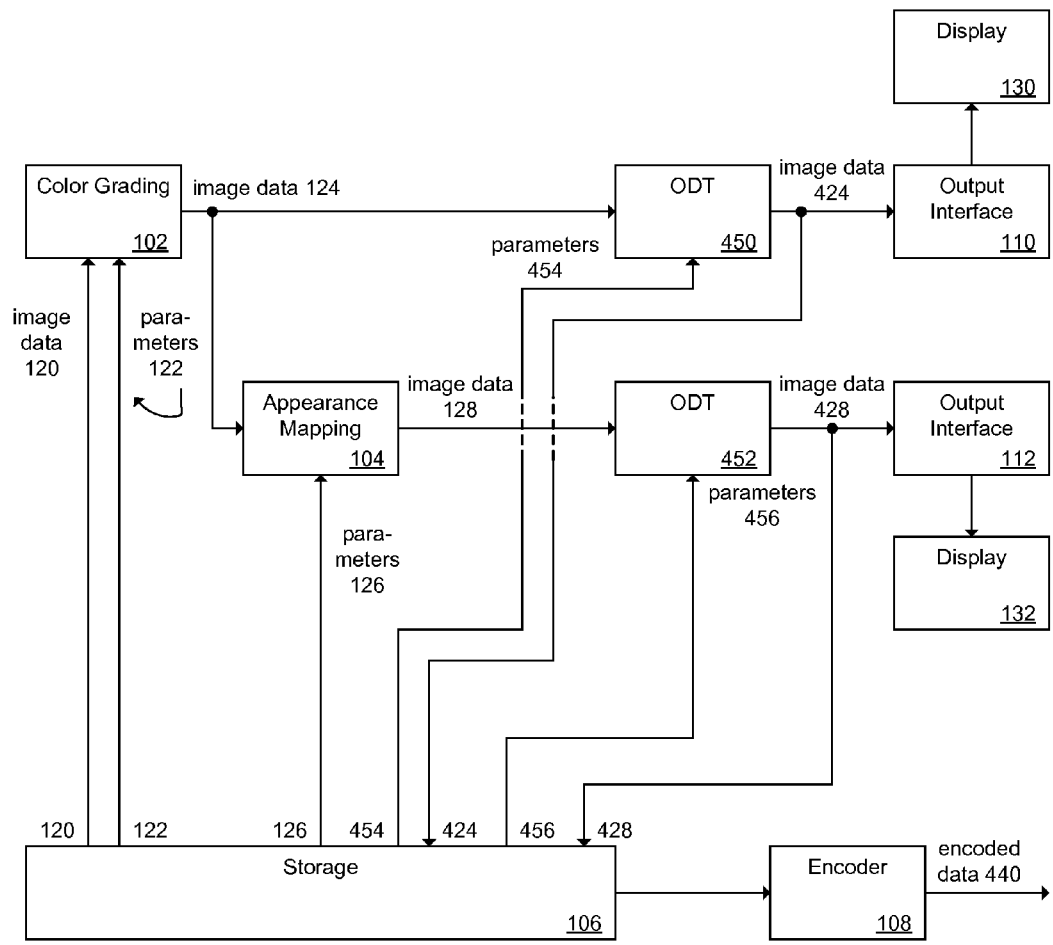
FIG. 4 is a block diagram of a video editing system according to an embodiment.

FIG. 4 is a block diagram of a video editing system 400 according to an embodiment. The video editing system 400 is similar to the video editing system 100 (see FIG. 1), with the addition of output device transform devices 450 and 452. For brevity, a description of the components similar to those in FIG. 1 is not repeated.

The output device transform device 450 receives the image data 124, performs a transform on the image data 124, generates transformed data 424 according to the image data 124 having been transformed, and provides the transformed data 424 to the display device 130 (via the output interface 110). The transform reduces a characteristic of the image data 124 that exceeds a display capability of the display device 130. The editor then performs user adjustment of the color grading parameters 122 in response to the transformed data 424 being displayed on the display device 130.

The output device transform device 450 may perform its transforms according to transform parameters 454. The transform parameters 454 may be stored in the storage device 106. The video editing system 400 may be configured to receive user adjustment of the transform parameters 454. In general, the transform parameters 454 configure the output device transform device 450 to perform appropriate transforms on the image data 124 for appropriate display by the display device 130. These appropriate transforms generally correspond to the inverse of the electro-optical transfer function (EOTF) for the display device. More specifically, the transform parameters 454 may adjust the following characteristics of the image data 124: non-linear response (gamma); luminance values for white and for colors; color chromaticities; local contrast for luminance and colors; and precision of addressable luminances and colors. As an example, assume that the image data 124 is RGB data in 16-bit floating point format, and that the highest precision of the display device 130 is 10 bits; the output device transform device 450 then reduces the precision to 10 bits for each channel of RGB. As another example, assume that the image data 124 is outside the gamut of the display device 130 (e.g., less than zero or greater than one); the output device transform device 450 then converts the color to within gamut by limiting the range of each channel to between zero and one.

The output device transform device 452 and the transform parameters 456 generally operate as described above regarding the output device transform device 450 and the transform parameters 454, but relating to the image data 128 and the display device 132.

Note that in the video editing system 400, the storage device 106 stores the transformed data 424 and the transformed data 428 (instead of the image data 124 and the image data 128 as in FIG. 1). This is to ensure that the image data that is encoded and transmitted (i.e., the encoded data 440) actually corresponds to what was seen on the displays 130 and 132, as opposed to what was sent to the displays 130 and 132. (The image data 124 and 128 may still be stored in the storage device 106 for archival purposes to use in the future.)

Figure 5:
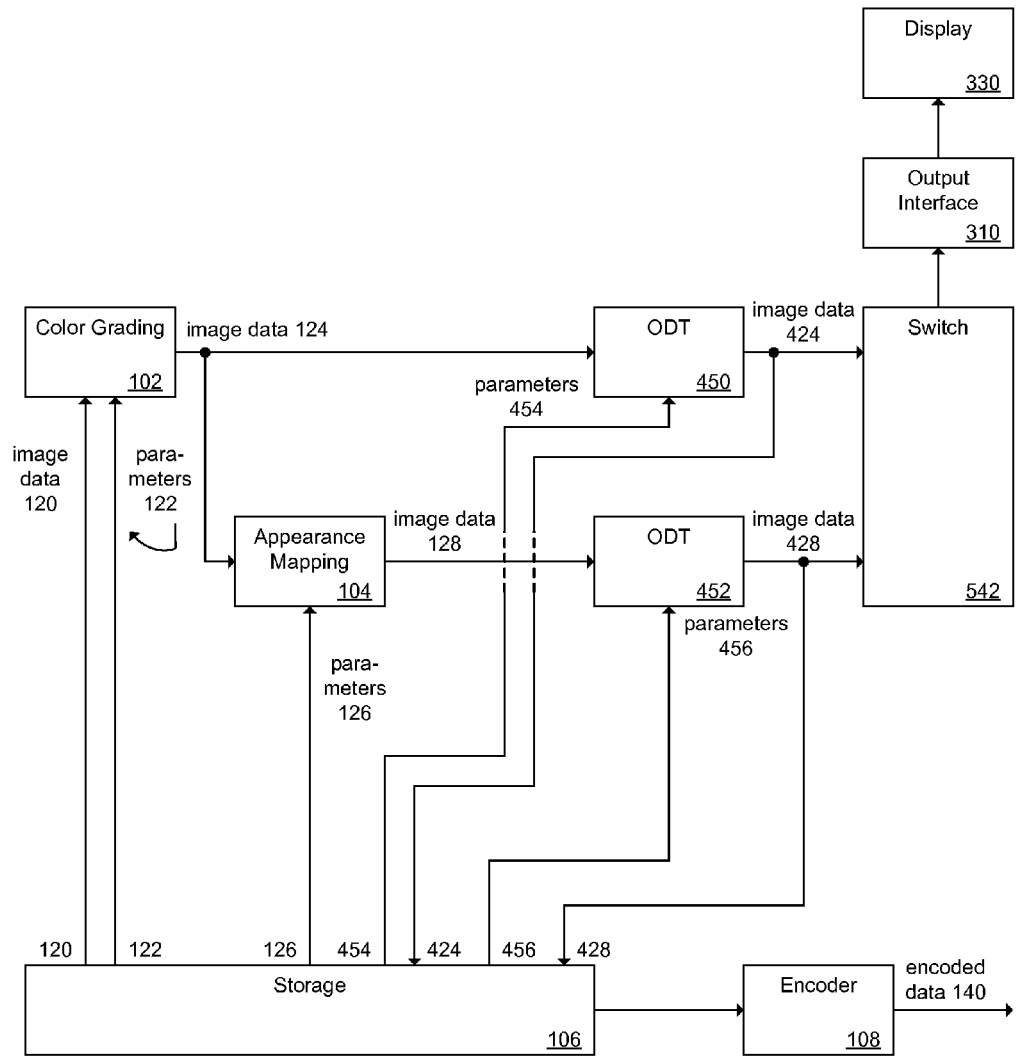
FIG. 5 is a block diagram of a video editing system according to an embodiment.

FIG. 5 is a block diagram of a video editing system 500 according to an embodiment. The video editing system 500 is similar to the video editing system 400 (see FIG. 4), with the addition of a switch 542. The video editing system 500 is also similar to the video editing system 300 (see FIG. 3), and is likewise connected to the display device 330. For brevity, a description of the components similar to those in previous figures is not repeated.

The switch 542 selectively provides the transformed data 424 and the transformed data 428 to the display device 330 (via the output interface 310). The switch 542 may be implemented variously in relation to the display device 330, as discussed above with reference to FIG. 3. As with the video editing system 300 (see FIG. 3), the video editing system 500 allows the editor to create multiple video streams without repositioning the gaze.

Figure 6:
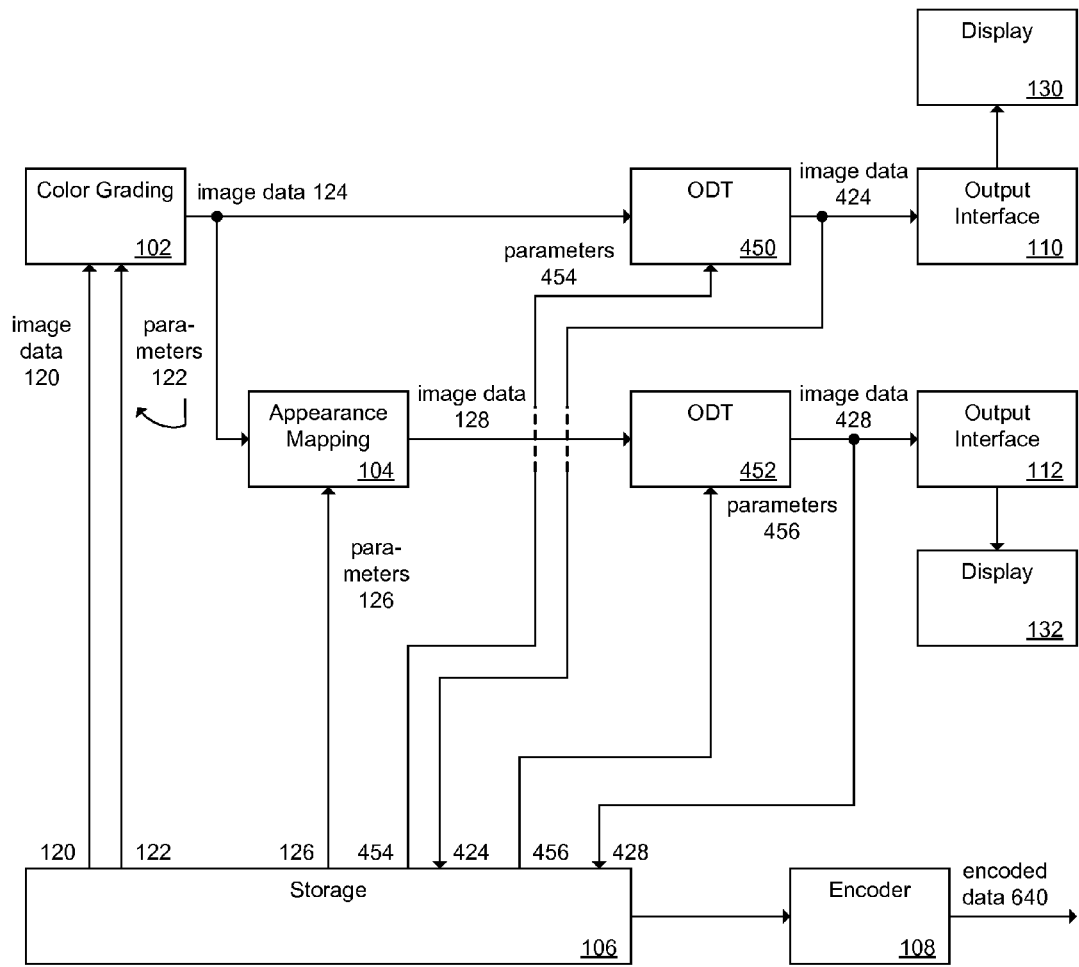
FIG. 6 is a block diagram of a video editing system according to an embodiment.

FIG. 6 is a block diagram of a video editing system 600 according to an embodiment. The video editing system 600 is similar to the video editing system 400 (see FIG. 4), and for brevity a description of the components similar to those in previous figures is not repeated. One difference from the video editing system 400 is that the encoder 108 includes the image data 120 (instead of the image data 124 or 128) in the encoded data 640.

As compared to the video editing system 400 (see FIG. 4), the video editing system 600 enables the distribution of the content in its original form.

Figure 7:
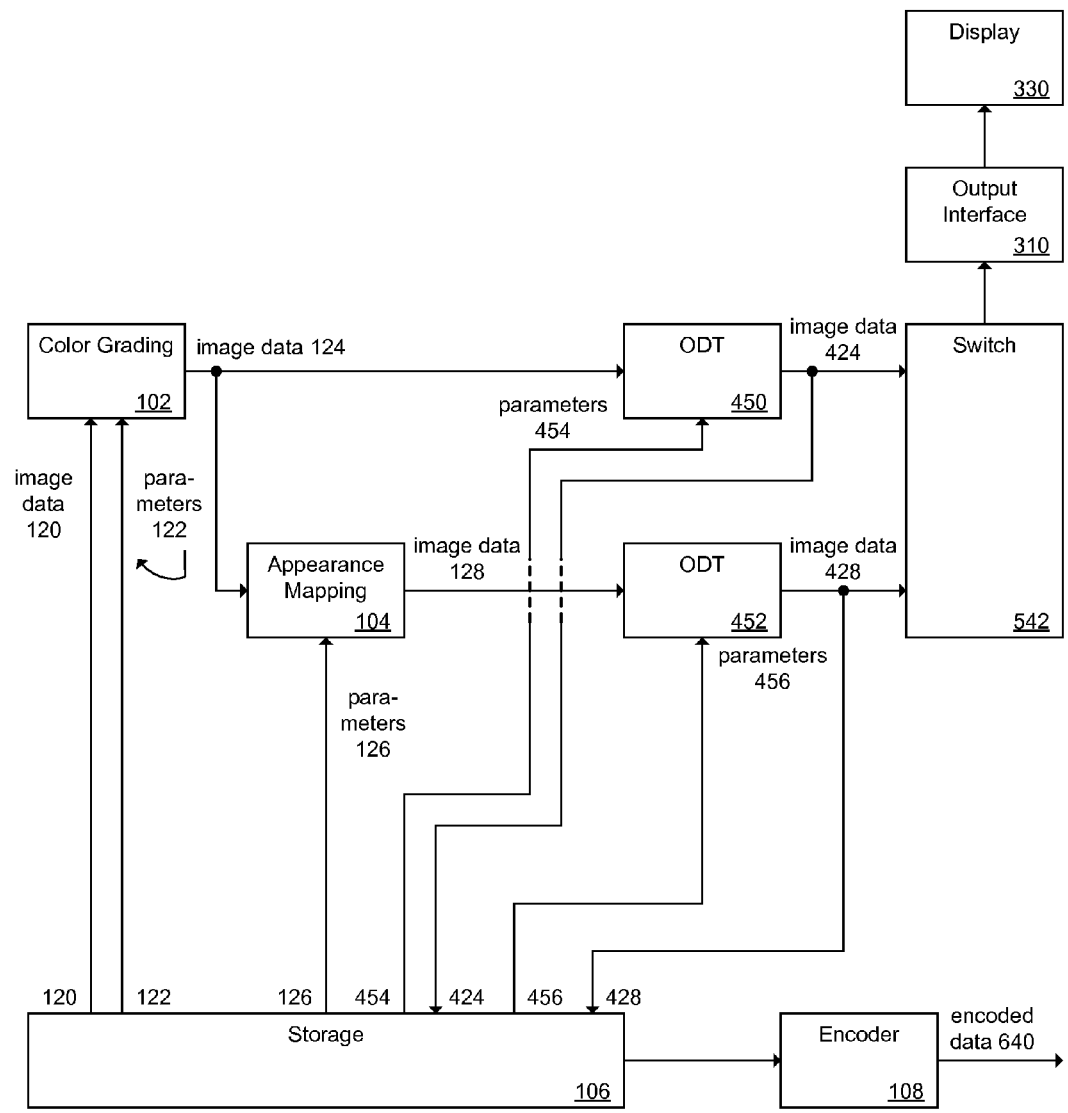
FIG. 7 is a block diagram of a video editing system according to an embodiment.

FIG. 7 is a block diagram of a video editing system 700 according to an embodiment. The video editing system 700 is similar to the video editing system 500 (see FIG. 5), with the image data 120 (instead of the image data 124 or 128) in the encoded data 640, as in the video editing system 600 (see FIG. 6). For brevity, a description of the components similar to those in previous figures is not repeated.

Figure 8:
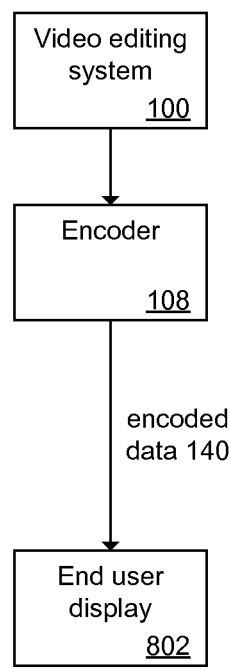
FIG. 8 is a block diagram that illustrates the end user environment according to an embodiment.

FIG. 8 is a block diagram that illustrates the end user environment 800 according to an embodiment. The end user environment 800 includes an end user display 802. The video editing system 100 (see FIG. 1, not part of the end user environment 800) generates the encoded data 140 that provides the input to the end user display 802.

The end user display 802 in general displays the encoded data 140. More specifically, the end user display 802 uses the information encoded in the encoded data 140 (e.g., the image data 124, the appearance mapping parameters 126, etc.) to generate an appropriate image for display. For example, if the encoded data 140 includes the image data 124 and the image data 128, the end user display 802 interpolates between the image data 124 and the image data 128 to generate its output. The interpolation may be performed according to a similarity between the user display 802, the display device 130 and the display device 132. The interpolation may be performed according to guide curves, according to functions that implement guide curves, or by lookup tables that implement guide curves, where the guide curves map the values for one display device to appropriate values for another display device. As another example, if the encoded data 140 includes the image data 124 and the appearance mapping parameters 126, the end user display 802 maps from the image data 124 using the appearance mapping parameters 126 as guide curves. As another example, if the encoded data 140 includes the image data 124, the end user display 802 maps from the image data 124 using assumed guide curves (e.g., the end user display 802 implements guide curves that correspond to assumed values for the appearance mapping parameters 126). As yet another example, if the encoded data 140 includes the image data 128, the end user display 802 maps from the image data 128 using assumed guide curves (or using actual guide curves, if the encoded data 140 also includes the appearance mapping parameters 126).

Alternatively, the video editing system 100 may be replaced in FIG. 8 with other of the video editing systems described above, for example the video editing system 300 (see FIG. 3), the video editing system 400 (see FIG. 4), the video editing system 500 (see FIG. 5), the video editing system 600 (see FIG. 6), or the video editing system 700 (see FIG. 7). In such a case, the end user display 802 generates its output based on the encoded data 140, the encoded data 440, or the encoded data 640, as appropriate, as well as the appearance mapping parameters 126 (and optionally the color grading parameters 122) as appropriate.

Subsequent Transmission of Multiple Content

Besides the encoder device 108, various other types of encoder devices may be used, once the editing process according to an embodiment has been performed, in order to transmit (or to generate for subsequent transmission) the multiple streams of content for display by the end user displays. One option is to encode the image data with correction information as disclosed in U.S. Application Pub. No 2009/0109344. Another option is to encode the multiple versions of the image data as disclosed in U.S. Pat. No. 7,639,882. Another option is to encode the image data as a standard version and an enhanced version with color function metadata as described in WO 2010/021705. Another option is to encode the image data as reformatted image content with metadata as described in WO 2008/122702. Another option is to encode the image data as look data packets as described in WO 2009/095732 and WO 2009/095733. Another option is to encode the image data as a plurality of virtual model versions as described in WO 2009/0022324.

Additional Embodiments

The embodiments described above have detailed how two versions of content streams may be generated. Similar principles may be applied for generating more than two versions. For example, the video editing system 100 (see FIG. 1) may be enhanced to generate three streams by adding a second appearance mapping device 104a and a third display device 132a; the second appearance mapping device 104a may operate on the image data 124 or the image data 128. As another example, the video editing system 300 (see FIG. 3) may be enhanced by adding a second appearance mapping device 104a and adjusting the switch 342 to receive the output of the appearance mapping device 104a.

Implementation Details

An embodiment of the invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for editing multiple video streams, comprising:
a color grading device that is configured to receive first image data and color grading parameters, to perform color grading on the first image data according to the color grading parameters, and to generate second image data that corresponds to the first image data having been color graded, wherein the color grading device is configured to receive user adjustment of the color grading parameters in response to the second image data being displayed on a first display device;
an appearance mapping device that is configured to receive the second image data and appearance mapping parameters, to perform appearance mapping on the second image data according to the appearance mapping parameters, and to generate third image data that corresponds to the second image data having been appearance mapped, wherein the appearance mapping device is configured to receive user adjustment of the appearance mapping parameters in response to the third image data being displayed on a second display device; and
a user device that is configured to receive the second image data and the third image data, to interpolate between the second image data and the third image data, to generate interpolated data according to the second image data and the third image data having been interpolated, and to display the interpolated data.

2. The system of claim 1, wherein the user device is configured to interpolate according to a similarity between the user device, the first display device and the second display device.

3. The system of claim 1, wherein the user device is configured to receive the appearance mapping parameters, and wherein the user device is configured to interpolate according to the appearance mapping parameters.

* * * * *